Jan. 22, 1935.    F. J. BAST    1,988,775
BALANCED CONTROL MECHANISM
Filed July 23, 1932
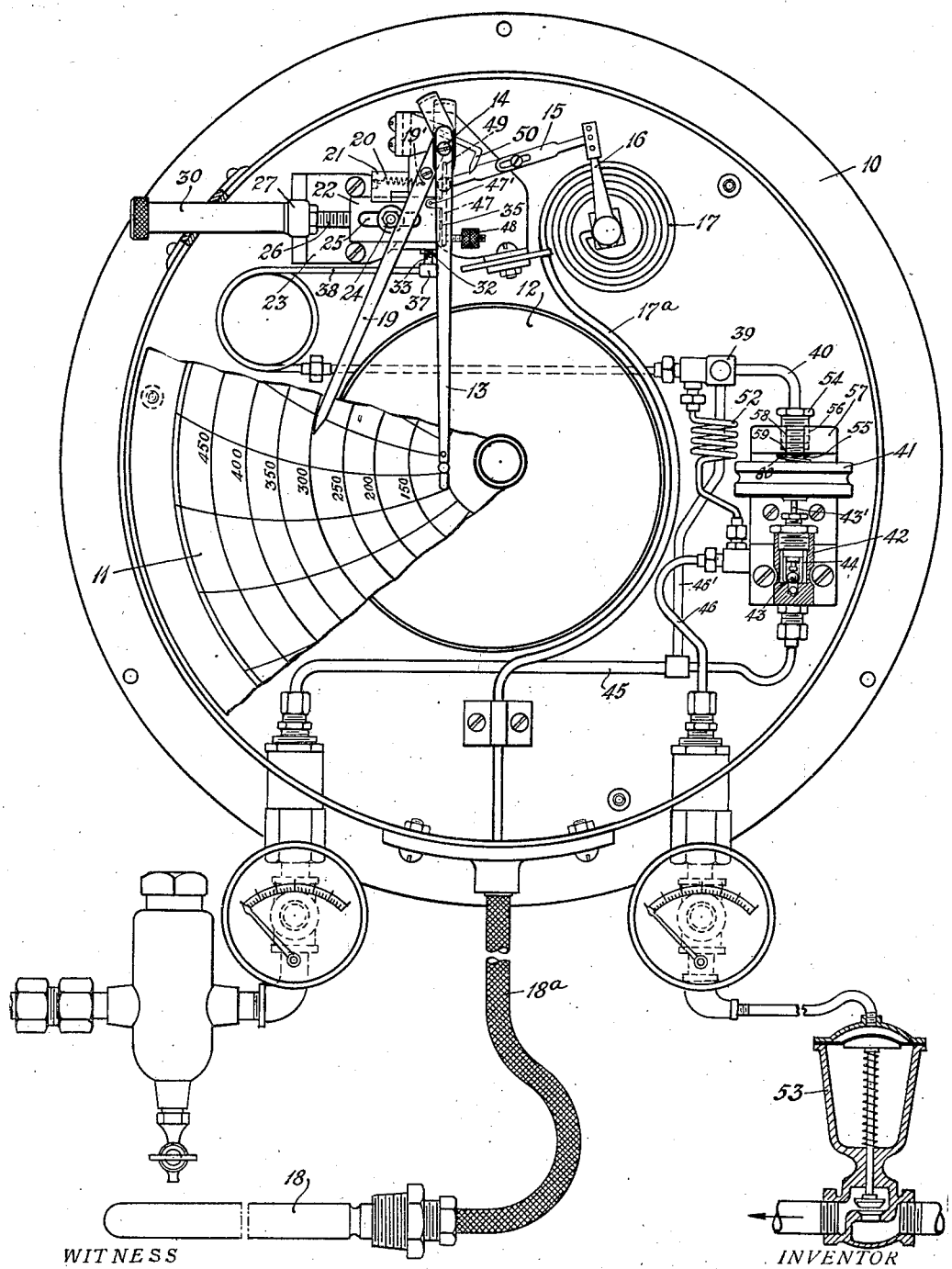
WITNESS
G. V. Rasmussen
BY
INVENTOR
FRANK J. BAST
ATTORNEYS Patented Jan. 22, 1935

1,988,775

UNITED STATES PATENT OFFICE 1,988,775

BALANCED CONTROL MECHANISM

Frank J. Bast, Queens Village, N. Y., assignor to Charles J. Tagliabue Mfg. Co., Brooklyn, N. Y., a corporation of New York Application July 23, 1932, Serial No. 624,301

9 Claims. (Cl. 236—82)

My invention relates to control mechanisms operative to regulate the opening and closing of a valve member controlling the flow of a treating fluid into an apparatus in response to fluctuations in the temperature or pressure in such apparatus in order to maintain predetermined conditions therein; and it is an object of the invention to provide a mechanism of this type which is substantially free from "hunting" and will produce a practically smooth and continuous time-temperature or time-pressure curve on the chart of a recorder.

Control mechanisms are now in use in which the regulation of a fluid-operated servo-motor, such as a diaphragm valve, in response to temperature or pressure changes in an apparatus under control is effected by controlling the fluid pressure upon the diaphragm or piston of the servo-motor through the medium of a pilot valve which in one position causes fluid under full pressure to flow to the servo-motor and in the reverse position effects discharge of the pressure fluid from such motor. Intermediate positions of the pilot valve produce throttling of the pressure fluid flow and effect corresponding intermediate adjustments of the servo-motor. It has been found in practice that such a control apparatus is very liable to "hunt", i. e. cause the temperature or pressure to fluctuate for a considerable time between limits slightly above and slightly below the predetermined temperature or pressure before the temperature or pressure becomes constant at the predetermined value. As a result, the recorder chart shows an irregular or wavy line every time that a rapid change in temperature or pressure occurs in the apparatus under control before the predetermined conditions are restored.

This hunting action occurs to an accentuated degree in sensitive, quickly responsive apparatus, such as those wherein the characteristics of the servo-motor and the fluid pressures are so determined that when the pilot valve is in one end position, the fluid pressure on the servo-motor is just able to bring the latter to one of its limiting positions, such as its closed position, while when the pilot valve is in its other end position, the servo-motor is relieved of so much pressure as is just sufficient to permit it to move into its other limiting position, such as its position of maximum flow. By such a relationship no excessive pressure is placed on the servo-motor when it is moved into one limiting position, nor is it caused to move beyond the other effective limiting position, so that it responds quickly to changes in the conditions in the apparatus under control as the adjustment thereof is not delayed by the time necessary to relieve the excess pressure or to return the motor through the excess distance traversed, as described and claimed in the copending application of Lawrence C. Irwin, Serial No. 565,396.

According to the present invention means are provided whereby the initial flow of air to and from the servo-motor is dampened or balanced upon change, especially sudden change, in the position of the pilot valve, so that the change in the adjustment of the servo-motor is gradual; sudden and rapidly fluctuating changes in the feed of a treating fluid to the apparatus under control are thereby avoided. In the preferred form of the invention, a balancing coil is shunted across the air conduit leading to the servo-motor, for example, in the type of mechanism shown in my United States Patent No. 1,837,397, and the air conduit leading to the expansible member controlling the position of the pilot valve, such coil operating to feed air in such manner as to oppose and weaken the immediate effect of an adjustment of the pilot valve upon the servo-motor.

Although the present invention is applicable in general to various kinds of fluid-operated control mechanisms which include a pilot valve for regulating the flow of operating pressure-fluid to a fluid-controlled servo-motor, such as a diaphragm valve, it will be described in connection with the mechanism disclosed in my above named patent.

The accompanying drawing shows, by way of example, a controller mechanism embodying the present invention. This mechanism comprises a casing 10 of any suitable type within which is rotatably supported a recording sheet 11 operated by clock-work mechanism 12 in a manner well known in the art. The sheet 11 is engaged by a pen-arm or stylus 13 which is pivoted upon a stud 14 fixed within the casing 10. The stylus 13 is actuated by any suitable responsive mechanism, and in the embodiment illustrated is connected by an adjustable link 15 to an arm 16 fixed to the inner end of a Bourdon spring 17. The latter is connected by a capillary tube 17a to a source of pressure, such as a thermostatic bulb 18, by means of the connection 18a. It will be understood that the outer end of the spring 17 is fixed to the casing while the inner end is free to move in response to changes in the pressure of the fluid in such spring.

Pivoted concentrically with the stylus 13 is a setting pointer or arm 19 which is adapted to overlie the sheet 11 as shown on the drawing. The setting of the pointer 19 predetermines, by means of the mechanism described hereinafter, the maximum temperature or pressure at the point where the thermostatic bulb 18 or equivalent responsive mechanism is located. The pointer 19 is urged by a spring 20 against an abutment 21 positioned on a block 22.

The block 22 is slidably mounted upon a base 23 fixed within the casing 10 and is guided in its sliding movement by means of a bolt 24 fixed to the base and passing through an elongated slot 25 in such block. A screw 26 is fixed at one end to the block 22 and is associated in such manner with a threaded sleeve 27 and a rotatable rod 30 that upon manual rotation of the rod 30 the block 22 is shifted longitudinally and the pointer 19 correspondingly adjusted, as described in detail in my above-mentioned patent.

The inner end of the block 22 is provided with a tapped hole which receives an internally and externally threaded member 32, as described in my said patent. An externally threaded screw 33 is received within the member 32 and is provided with an axial channel which communicates at its upper end with a nozzle 35 which projects through a vertical slot cut through the right-hand section of the block 22. The outlet end of the latter is planar for the purpose to be described hereinbelow. The member 32 is externally threaded right-hand and internally left-hand so that upon revolution thereof the screw 33, which is threaded left-hand, is given an axial or longitudinal movement free of rotation. The lower end of the screw 33 is fitted with a head or cap 37 which is tapped to receive the threaded end of an air conduit 38 soldered to such head and communicating with the channel in screw 33. Upon rotation of the member 32 the nozzle 35 is moved upward or downward.

The conduit 38 is connected to a block 39. The latter is connected by means of a pipe 40 with the interior of an expansible or capsular spring 41 which is operatively associated with a ball valve 42. The valve may be composed of a ball 43 which controls the communication between the valve chamber 44 and an air supply conduit 45. The ball may be urged toward the open position by a spring or by the pressure of the fluid in conduit 45, and upon expansion of the spring 41 is forced into closed position against its seat by a stem 43' which is engaged by the diaphragm. The stem is guided within an enlarged bore in the valve body and is provided with a head at its inner end which, when the ball 43 is in open position, closes such bore. When the stem has been forced inwardly by the capsular spring 41 to force the ball 43 against its seat, the air or other pressure fluid in the chamber 44 is exhausted into the atmosphere through such enlarged bore.

The valve chamber is connected by means of a pipe 46 with the diaphragm casing of a diaphragm valve or other suitable servo-motor adapted to control the flow of heating or other fluid to the vessel whose temperature or pressure is being controlled. A conduit 46' connects the air supply pipe 45 with the block 39. The block has a small hole about 0.010" in diameter through which air is supplied to the capsular spring 41 and to the nozzle 35. The orifice of the latter is about 0.015" in diameter, and when open, permits all of the air going through block 39 to escape therethrough, so that there is no pressure in the capsule 41.

Pivoted at 47' upon the block 22 above the nozzle 35 is a plate or flap valve 47 weighted at 48 and adapted to cover the orifice or outlet end of the nozzle 35 so as to prevent the escape of air therefrom. Due to the fact that the nozzle outlet is cut along a plane, an air-tight engagement between the valve 47 and nozzle 35 is assured. The flap valve 47 has a portion 49 thereof extending above its pivot and located in the path of movement of a lever 50 pivoted about the pivot of the stylus 13 and fixed to the latter so as to move therewith.

The operation of the mechanism so far described is as follows: In the normal position of the parts the flap valve 47 rests against the outlet end of the nozzle as shown in the drawing, i. e. the nozzle 35 is closed. Air from pipe 45 is charged into capsule 41 through block 39 and pipe 40; the diaphragm expands and engages the valve pin or stem 43' of the valve 42 and forces the ball 43 to close the communication between the valve chamber 44 and pipe 45, so that the supply of air to the valve is cut off. Simultaneously the pipe 46 is placed in communication with the external atmosphere. In this manner the supply of compressed air to the servo-motor through the pipe 46 is cut off and the air in such motor is discharged. In the embodiment of the invention illustrated such discharge of the air causes the valve controlled by the servo-motor to open so that a hot fluid or other medium is fed to the vessel or apparatus whose temperature or pressure is being controlled.

It will be understood that the temperature or pressure of such apparatus will be indicated upon the chart 11 by means of the stylus 13. Should the temperature (or pressure) rise above a predetermined value, as indicated by the setting of the arm 19 and consequently by the position of the flap valve 47, the lever 50 will engage the extension 49 of such valve and oscillate the same to open partially the nozzle 35. A portion of the air in capsule 41 is thus permitted to discharge through the nozzle 35 and the ball valve 43 permitted to rise under the action of a spring to close partially the communication between pipe 46 and the atmosphere and to open partly the inlet of pipe 45 into the valve chamber 44. Sufficient air is thereupon charged by the pipe 45 into pipe 46 and thence into the servo-motor 53 to depress the diaphragm thereof to an extent sufficient to cause the feed-valve controlled thereby to feed just enough fluid, such as steam, into the apparatus to maintain the temperature (or pressure) therein at the predetermined value.

It was pointed out above that the nozzle orifice is larger than the opening in block 39; this permits the air in the capsule 41 to be rapidly discharged to cause rapid closing of the feed-valve. The rapidity with which this discharge takes place may be controlled by vertically adjusting the nozzle 35. By moving the nozzle toward the pivot 47' of the flap valve 47, the air escaping from the nozzle is throttled, and greater angular displacement of the valve 47 is required than when the nozzle is positioned further away from the pivot to expose fully the nozzle orifice and permit unhindered discharge of the air. Such throttling of the air is desirable when the point at which the temperature is taken heats slowly; in such event, therefore, the nozzle is positioned near the fulcrum 47'. When, on the other hand, the point at which the temperature is taken heats rapidly, the nozzle is positioned further away from the fulcrum.

It has been found that in many situations in practice, the device above described yields a recorder chart on which the time-temperature or time-pressure curve is not a smooth, continuous curve, but is rather a wavy curve, particularly at the portions following those instants at which a sudden change in the temperature or pressure occurred in the apparatus under control. These temperature or pressure fluctuations are due to a time lag between the introduction of treating fluid into the apparatus (or the instant it passes through the valve when the latter is remote from the apparatus) and the control action of the thermo-sensitive or equivalent mechanism.

In accordance with the present invention, there is provided a shunt or pressure balancing coil or line 52 between the feed line 46 to the diaphragm valve 53 and the feed back 40 from the capsule 41 to the nozzle 35, so that the pipes 40 and 46 are permanently connected. The coil 52 may be connected at either side of block 39. The effect of the coil 52 (which may also be a piece of straight piping of small bore) is the following:

When the flap valve 47 moves to open the nozzle orifice partially or fully, the capsule 41 becomes deflated and air passes from pipe 45 through the pilot valve 42 to the diaphragm valve, but a portion of the controlled air escapes through the balancing coil 52 and the orifice of the nozzle. This escaping air tends to retard the deflation of the capsule. The adjustment of the diaphragm valve is thus reduced or retarded, and the valve does not follow completely every change in the temperature or pressure at the place under control. When, on the other hand, the flap valve moves to close the nozzle orifice partly or fully so as to vent the air from the diaphragm valve through the pilot valve into the atmosphere through the space about the stem 43', part of the air from the orifice line 40 introduced by the pipe 46' passes through the balancing coil 52 to the same vent about the stem 43', so that the expansion of the capsule 41 and hence the speed of venting are retarded. The net effect of the balancing coil 52 is thus to introduce a resistance to sudden disturbances which would interfere with smooth throttling.

The balancing coil can be used only with a direct acting pilot valve; that is, a valve in which depression of the valve stem closes the air supply inlet and permits venting of the diaphragm valve, whereas in the upper position of the stem, the outlet to the atmosphere is closed and the diaphragm valve is connected with the air supply line. If reverse acting control is required, which would ordinarily demand a reverse acting pilot valve, then a reverse acting flapper and nozzle assembly (35, 47) must be provided while the direct acting pilot valve is retained and the balancing coil connected as illustrated.

My invention is of particular advantage in arrangements wherein, when the orifice of nozzle 35 is closed by the flap valve 47, the discharge of air from the capsule 41 through the coil 52, into the valve chamber 44 and through the free space surrounding the stem 43' into the atmosphere, keeps the capsule partly deflated to such an extent as to maintain a pressure upon the diaphragm of the diaphragm valve 53 just sufficient to keep such latter valve in its position of maximum flow under the action of its spring; that is, no excessive movement is performed by the valve. When, however, the control requires a fully closed diaphragm valve, the nozzle being then fully exposed by the flap valve 47, the capsule 41 becomes fully deflated through such nozzle, the arrangement of the pin 43' with respect to the capsule 41 being such that when the capsule is fully deflated the maximum pressure on the diaphragm is just sufficient to close the diaphragm valve safely, i.e. no excessive pressure is exerted on the valve which must be relieved before the valve can begin to open.

The maximum and minimum air pressures for the diaphragm valve may be about 8 and 4 lbs. respectively, although other pressure limits may be employed. When a given instrument is to be applied to an apparatus which requires different pressure limits, the range of air pressure may be adapted to the functioning of the controller by regulating the position of the capsule 41 or by adjusting the resistance of the balancing coil 52 to suit the valve's air pressure operating characteristics. A balancing coil of greater resistance may be provided by employing piping of smaller bore; I prefer, however, in view of the fact that coils of very small bore are liable to be clogged by dust, to increase the resistance of a coil by increasing the number of convolutions therein. The bore of coil 52 may be larger (.020 in.) than the discharge opening of pipe 46' in block 39 (.015 in.) but the resistance of coil 52 is greater because of the convolutions therein.

The capsule 41 may be vertically adjusted by means of an internally and externally threaded sleeve 54 which receives the threaded stem 55 of the capsule 41, the inner and outer threads of the sleeve being of different pitch. The sleeve is received in a threaded bore 56 in a forwardly extending bracket 57, the bore having an open slot 58 through which the stem 55 is inserted. The stem is flattened at opposite sides, the latter being engaged by tongues 59 below the bore 56 and the stem thereby held against rotation. Backlash is prevented by a spring 60. It will be clear that upon rotation of the sleeve 54 the stem, and hence the capsule 41, will be given a differential vertical adjustment with respect to the stem 43' of the pilot valve.

By changing the position of capsule 41 the pressure range for the valve 53 may be changed, as from 4 and 8 lbs. to 6 and 10 lbs. By changing the resistance of coil 52, the differential may be changed as from 4 and 8 lbs. to 2 and 8 lbs. By changing both, a change in pressure range and also in pressure differential may be secured, as from 4 and 8 lbs. to 6 and 12 lbs.

As already indicated, the maximum and minimum air pressures operating upon the diaphragm valve 53 are preferably so selected that the valve either just closes or just opens to its maximum effective flow position; the control range is thus within the maximum and minimum air pressures and any variation in such pressure produces an immediate response in the diaphragm valve without tendency to hunt. When the nozzle 35 is in its lowermost position, a temperature change at the bulb 18 is transmitted exceedingly quickly. The coil 52, however, operates to delay transmission of air pressure to the diaphragm valve to such a degree as to straighten out the fluctuations in the pressure which usually result when the response of the diaphragm valve to the bulb impulse is too rapid to permit waves of consecutive impulses to cancel each other. In other words, the diaphragm valve does not follow every momentary change in the temperature or pressure of the apparatus under control but tends rather to follow the mean temperature or pressure, and hence the curve of the recorder chart is a more nearly smooth and continuous curve than could be obtained with prior apparatus.

It will be obvious that the present invention may be applied to arrangements other than the specific one illustrated, and that variations may be resorted to within the scope of the appended claims without departing from the spirit of the invention.

I claim:

1. In a temperature or pressure control apparatus, the combination with a pressure fluid-operated servo-motor, of a pilot valve controlling the flow of pressure fluid to such motor, mechanism for regulating the position of said valve in accordance with a variable condition at the place under control to produce a compensating adjustment of the servo-motor, said mechanism including an expansible member associated with the pilot valve, a compressed air conduit connected with said member, a nozzle communicating with said member, and means responsive to said variable condition for regulating the port of said nozzle, and a leak pipe permanently in communication with the member and operating to delay the adjustment of the pilot valve by said regulating mechanism and thereby retard the full effect upon such servo-motor of a change in the said variable condition.

2. In a temperature or pressure control apparatus, the combination with a pressure fluid-operated diaphragm valve, of a pressure air line, a pilot valve controlling such air line, an expansible member arranged to control said pilot valve, mechanism responsive to a variable condition at the place under control and operative to govern the pressure on said expansible member and thereby regulate the position of said pilot valve, and connection between the expansible member and the air line running from the pilot to the diaphragm valve, changes in the pressure on said diaphragm valve thus being temporarily partially arrested by said expansible member acting through said pilot valve and full adjustment of the diaphragm valve corresponding to changes in the said variable condition being thereby delayed.

3. In a temperature or pressure control apparatus, the combination with a pressure fluid operated diaphragm valve, of a pressure air line for delivering air under pressure to the diaphragm of such valve; a pilot valve controlling such air line and adjustable to connect said diaphragm valve with the pressure air line or with the atmosphere; responsive mechanism arranged to regulate the position of said pilot valve in accordance with a condition at the place under control, said mechanism comprising an expansible member arranged to adjust said pilot valve, a pipe connected with said expansible member and terminating in an orifice, a valve controlling said orifice, and an expansible element connected with the apparatus under control and associated with said last mentioned valve to adjust the same in response to changes in said condition; an air conduit leading to said pipe; and a balancing pipe connecting said first-mentioned pipe with the pressure air line at a point behind the pilot valve, whereby upon change in the position of the pilot valve tending to produce change in the pneumatic pressure on the diaphragm valve, air is shunted into or from the expansible member to reduce the degree of adjustment of the pilot valve and thereby delay the full change in the adjustment of the diaphragm valve.

4. In a temperature or pressure control apparatus, the combination with a pressure fluid operated diaphragm valve, of a pressure air line for delivering air under pressure to the diaphragm of such valve; a pilot valve controlling such air line; responsive mechanism arranged to regulate the position of said pilot valve in accordance with a condition at the place under control, said mechanism comprising an expansible member arranged to adjust said pilot valve, an air conduit connected with said expansible member and terminating in an orifice, a valve controlling said orifice, and an expansible element connected with the apparatus under control and associated with said last mentioned valve to adjust the same; said pilot valve constructed to connect the diaphragm valve with the atmosphere when the expansible member is expanded, and to connect the valve with the pressure air line when the member is contracted; a feed pipe connecting the pressure air line in advance of the pilot valve with the air conduit; and a balancing pipe connecting said air conduit with the pressure air line at a point behind the pilot valve, whereby upon opening of the said orifice part of the air fed to the diaphragm valve is vented through such balancing pipe to the orifice, while upon closing of said orifice air from said feed pipe passes through the balancing pipe and pilot valve into the atmosphere, so that the full effect on the diaphragm valve of a control impulse upon the pilot valve is retarded upon changes in the position of the orifice valve.

5. The combination as set forth in claim 4 wherein said balancing pipe is in the form of a coil composed of piping of small diameter.

6. The combination as set forth in claim 4, wherein the expansible member may be moved bodily with respect to the pilot valve to vary the range of the pressure limits between which the diaphragm valve is operated.

7. The combination as set forth in claim 4, wherein the expansible member, the pilot valve, and the balancing pipe are so related that when the expansible member is fully expanded or contracted, air of such pressure acts on the diaphragm valve that the latter just closes or opens to just its position of maximum flow.

8. In a temperature or pressure control apparatus, the combination with a pressure-fluid operated servo-motor, of a pressure air line for delivering air under pressure to said motor, a pilot valve controlling the flow of pressure-air to such motor, means controlling the position of the pilot valve, comprising an expansible member associated with the pilot valve, a nozzle connected with the interior of said expansible member, a valve controlling the discharge port of said nozzle and responsive mechanism arranged to regulate the position of said nozzle valve in accordance with a variable condition at the place under control to produce a compensating adjustment of the servo-motor, and a high resistance pipe connecting said expansible member with the air line between the pilot valve and motor and operating to arrest temporarily the full adjustment of the pilot valve in correspondence with an adjustment of the nozzle valve and thereby retard the full effect upon such servo-motor of a change in the said variable condition.

9. In a temperature or pressure control apparatus, the combination with a pressure-fluid operated servo-motor, of a pilot valve controlling the flow of pressure-fluid to such motor, means controlling the position of the pilot valve, comprising an expansible member associated with the pilot valve, a nozzle connected with the interior of such member, a conduit arranged to charge air under pressure into said member, a valve controlling the discharge port of said nozzle, and responsive mechanism arranged to regulate the position of said nozzle valve in accordance with a variable condition at the place under control to adjust the position of the pilot valve correspondingly and thereby produce a corresponding adjustment of the servo-motor, and a high resistance leak conduit connecting the interior of said member and the pressure-fluid space of said servo-motor, whereby the full effect of a control impulse resulting from the movement of the nozzle valve is delayed by leakage of pressure-fluid through said high resistance conduit in one or the other direction.

FRANK J. BAST.